United States Patent
Prashant et al.

(10) Patent No.: US 10,963,680 B2
(45) Date of Patent: Mar. 30, 2021

(54) OVERHEAD PEOPLE DETECTION AND TRACKING SYSTEM AND METHOD

(71) Applicant: Capillary Technologies International Pte Ltd., Singapore (SG)

(72) Inventors: Maheshwari Prashant, Bengaluru (IN); Behera Saurav, Bangalore (IN); Alex Doney, Bangalore (IN); Banerjee Sumandeep, Bangalore (IN); Panda Subrat, Bengaluru (IN)

(73) Assignee: CAPILLARY TECHNOLOGIES INTERNATIONAL PTE LTD, Sgx Centre Ii (SG)

( * ) Notice: Subject to any disclaimer, the term of this patent is extended or adjusted under 35 U.S.C. 154(b) by 232 days.

(21) Appl. No.: 16/244,753

(22) Filed: Jan. 10, 2019

(65) Prior Publication Data

US 2019/0220655 A1 Jul. 18, 2019

(30) Foreign Application Priority Data

Dec. 1, 2018 (IN) .............................. 201841001347

(51) Int. Cl.
*G06K 9/00* (2006.01)
*G06T 7/292* (2017.01)
(Continued)

(52) U.S. Cl.
CPC ..... *G06K 9/00335* (2013.01); *G06K 9/00369* (2013.01); *G06K 9/00718* (2013.01);
(Continued)

(58) Field of Classification Search
CPC ........... G06K 9/00335; G06K 9/00362; G06K 9/00771; G06K 9/00201; G06K 9/00369;
(Continued)

(56) References Cited

U.S. PATENT DOCUMENTS 8,861,784 B2 * 10/2014 Tojo .................. G06K 9/00261
382/103
10,002,309 B2 * 6/2018 Brown ................ G06K 9/6218
(Continued)

OTHER PUBLICATIONS

"A People Counting System based on Head-shoulder Detection and Tracking in Surveillance Video"; Huazhong Xu, 2010 International Conference on Computer Design and Appliations (ICCDA 2010) (Year: 2010).*

(Continued)

*Primary Examiner* — Michael S Osinski
(74) *Attorney, Agent, or Firm* — Harness, Dickey & Pierce, P.L.C.

(57) ABSTRACT

An overhead people detection and tracking system and method is provided. The system includes a memory having computer-readable instructions stored therein. The system includes a processor configured to access a plurality of video frames captured using one or more overhead video cameras installed in a space. The processor is configured to extract one or more images of the space from the plurality of video frames. Further, the processor is configured to process the one or more images to identify person detections in the space. Each detection corresponds to a person present in the space. In addition, the processor is configured to analyze the detections to define at least one of true positives and false positives associated with movement of one or more persons within the space. Furthermore, the processor is configured to maintain a count of the one or more persons entering and/or exiting the space based upon at least one of the true positives and the false positives.

20 Claims, 8 Drawing Sheets

(51) Int. Cl.
*G06K 9/62* (2006.01)
*G06N 20/10* (2019.01)

(52) U.S. Cl.
CPC ........ *G06K 9/00771* (2013.01); *G06K 9/6256* (2013.01); *G06K 9/6267* (2013.01); *G06N 20/10* (2019.01); *G06T 7/292* (2017.01); *G06T 2207/20081* (2013.01)

(58) Field of Classification Search
CPC .......... G06K 9/00718; G06K 9/00778; G06K 9/4671; G06K 9/6267; G06K 9/6256; G06T 7/292; G06T 2207/20081; G06T 2207/10016; G06T 2207/30201; G06T 2207/30242; G06T 2207/30196; G06T 2207/30232; G06T 2207/30241; G06T 2207/10024; G06T 2207/20076; G06T 7/246; G06T 7/20; G06N 20/00
See application file for complete search history.

(56) References Cited

U.S. PATENT DOCUMENTS

| | | | | |
|---|---|---|---|---|
| 10,009,579 | B2* | 6/2018 | Wang | G06K 9/00778 |
| 10,083,352 | B1* | 9/2018 | Solh | G06K 9/00335 |
| 10,186,124 | B1* | 1/2019 | Mullins | H04R 27/00 |
| 10,448,006 | B2* | 10/2019 | Caicedo Fernandez | H04N 5/2256 |
| 10,521,689 | B2* | 12/2019 | James | G06K 9/4642 |
| 10,789,720 | B1* | 9/2020 | Mirza | G06T 7/74 |
| 2006/0104487 | A1* | 5/2006 | Porter | H04N 7/15 382/118 |
| 2006/0170769 | A1* | 8/2006 | Zhou | G08B 13/19613 348/143 |
| 2011/0026770 | A1* | 2/2011 | Brookshire | G06K 9/00805 382/103 |
| 2011/0037852 | A1* | 2/2011 | Ebling | G06K 9/00778 348/143 |
| 2012/0033852 | A1* | 2/2012 | Kennedy | G06K 9/00 382/103 |
| 2013/0128051 | A1* | 5/2013 | Velipasalar | H04N 1/00029 348/158 |
| 2013/0142390 | A1* | 6/2013 | Othmezouri | G06T 7/251 382/103 |
| 2013/0148852 | A1* | 6/2013 | Partis | G06T 7/194 382/103 |
| 2013/0230240 | A1* | 9/2013 | Muninder | G06K 9/00234 382/165 |
| 2014/0226855 | A1* | 8/2014 | Savvides | G06K 9/00771 382/103 |
| 2014/0376780 | A1* | 12/2014 | Ueda | G06K 9/00362 382/106 |
| 2015/0213702 | A1* | 7/2015 | Kimmel | G06T 7/20 382/103 |
| 2017/0225321 | A1* | 8/2017 | Deyle | B25J 9/1679 |
| 2018/0047171 | A1* | 2/2018 | Chen | G06T 7/13 |
| 2018/0060653 | A1* | 3/2018 | Zhang | G06K 9/4628 |
| 2019/0019228 | A1* | 1/2019 | Reddy | G06Q 30/0224 |
| 2019/0180597 | A1* | 6/2019 | Wang | G06K 9/00221 |
| 2019/0370551 | A1* | 12/2019 | Mao | G06K 9/03 |

OTHER PUBLICATIONS

"Directional People Counter Based on Head Tracking"; Jorge García, IEEE Transactions on Industrial Electronics, vol. 60, No. 9, Sep. 2013 (Year: 2013).*

* cited by examiner

OVERHEAD PEOPLE DETECTION AND TRACKING SYSTEM AND METHOD

PRIORITY STATEMENT

The present application hereby claims priority to Indian patent application number 201841001347 filed 12 Jan. 2018, the entire contents of which are hereby incorporated herein by reference.

FIELD

The invention is generally directed to object detection and more particularly to techniques related to effective and accurate overhead people detection and counting in a space.

BACKGROUND

With the development of intelligent monitoring technologies, people detection and tracking has made a lot of progress in recent years. Counting people is useful in understanding the flow of people in public resource management and video surveillance. Real time people detection and counting in spaces has been researched and is used in a wide range of applications from efficient allocation of resources in smart buildings to retail outlets to handling emergency situations.

Most of the work in the field of object/people detection has been approached using front to-parallel or front view of the objects in space such as pedestrian detection algorithms. However, due to occlusion and depth perception, the tracking and detection results may not be accurate. Moreover, it requires extra hardware such as multiple cameras, for detection and tracking of multiple people in cluttered scenes. The processing power required and cost of multiple cameras makes the use of such methods undesirable. Alternatively, top view detection and tracking solutions allow to detect and track with minimal or no occlusions.

Moreover, constant movement of people, including people of different age groups and body types makes people detection a challenging process. In addition, there is a significant variation in a person's appearances depending only on their position in the space. Other techniques like blob detection using BG subtract may not perform well in cluttered environments. These techniques are also very susceptible to outdoor scenarios with shadows and where light conditions change constantly. Such solutions are susceptible to illumination changes, shadows and reflections.

Most recently, certain deep learning solutions have been used in people tracking and detection. However, such solutions are computationally expensive and require specialized hardware to obtain the results in real time. Similarly, classic and effective techniques like Histogram of Oriented Gradient (HOG), SVM and their modifications do not perform well in the current detection techniques. Moreover, factors such as presence of obstacles and varying lighting conditions make the process of accurately estimating the number of people in an area at given time very difficult.

Other single and multi-object trackers achieve a very low frame speed. For example, MDNet and VITAL give 1 FPS and 1.5 FPS respectively with Tesla GPU, while MSDAT, RDT, BACF gives 30-40 FPS but requires GPU. Consequently, both detection as well as tracking of people becomes highly challenging and ambiguous.

Each algorithm performs differently in terms of efficiency, flexibility and accuracy for different scenarios. The performance of such algorithms under real-time scenarios demonstrates the need for more accurate and faster people detection algorithms. It is challenging to evaluate these algorithms with respect to different real-time application scenarios and other environment conditions. Thus, there is a need of achieving a real time detection and tracking technique that is computationally light and at the same time provides accurate results.

SUMMARY

The following summary is illustrative only and is not intended to be in any way limiting. In addition to the illustrative aspects, example embodiments, and features described, further aspects, example embodiments, and features will become apparent by reference to the drawings and the following detailed description. Example embodiments provide an overhead people detection and tracking system.

Briefly, according to an example embodiment, an overhead people detection and tracking system is provided. The system includes a memory having computer-readable instructions stored therein. The system includes a processor configured to access a plurality of video frames captured using one or more overhead video cameras installed in a space. The processor is configured to extract one or more images of the space from the plurality of video frames. Further, the processor is configured to process the one or more images to identify person detections in the space. Each detection corresponds to a person present in the space. In addition, the processor is configured to analyze the detections to define at least one of true positives and false positives associated with movement of one or more persons within the space. Furthermore, the processor is configured to maintain a count of the one or more persons entering and/or exiting the space based upon at least one of the true positives and the false positives.

According to another example embodiment, an overhead people detection and tracking system is provided. The system includes a plurality of overhead video cameras installed within a space. Each of the plurality of overhead video cameras configured to capture real-time video at pre-determined resolution corresponding to pre-determined detection scales. The system includes a feature-based detector communicatively coupled to the plurality of overhead video cameras and configured to access video frames of the captured video. The feature-based detector is configured to process the video frames and identify person detections in the space. The feature-based detector is further configured to analyze the people detections and define the detections as at least one of true positives and false positives. The system further includes a tracking module configured to estimate and maintain the count of the one or more persons entering and/or exiting the space based upon at least one of the true positives and the false positives. Further, the system includes a processing module configured to create an input buffer queue of video frames and to process a plurality of detection threads of the detector to perform detection of persons and to process a tracking thread of the tracking module to perform tracking of the persons for each of the video frames of the input buffer queue.

According to yet another embodiment, a method for detecting and tracking persons in a space. The method includes accessing a plurality of video frames captured using one or more overhead video cameras installed in a space. The method includes extracting one or more images of the space from the plurality of video frames. In addition, the method includes processing the one or more images to identify person detections in the space. Each detection corresponds to a person present in the space. The method further includes analyzing the detections to define at least one of true positives and false positives associated with movement of one or more persons within the space. The method includes maintaining a count of the one or more persons entering and/or exiting the space based upon at least one of the true positives and the false positives.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein.

DETAILED DESCRIPTION OF EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein.

Accordingly, while example embodiments are capable of various modifications and alternative forms, example embodiments are shown by way of example in the drawings and will herein be described in detail. It should be understood, however, that there is no intent to limit example embodiments to the particular forms disclosed. On the contrary, example embodiments are to cover all modifications, equivalents, and alternatives thereof. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed but may also have additional steps not included in the figure. The processes may correspond to methods, functions, procedures, subroutines, subprograms, etc.

Specific structural and functional details disclosed herein are merely representative for purposes of describing example embodiments. Inventive concepts may, however, be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the scope of inventive concepts.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" may encompass both an orientation of above and below. The device may be otherwise oriented (rotated 90 degrees or at other orientations) and the spatially relative descriptors used herein are interpreted accordingly.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The device(s)/apparatus(es), described herein, may be realized by hardware elements, software elements and/or combinations thereof. For example, the devices and components illustrated in the example embodiments of inventive concepts may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described example embodiments of the inventive concept may be implemented with program instructions which may be executed by computer or processor and may be recorded in computer-readable media. The media may also include, alone or in combination with the program instructions, data files, data structures, and the like. The program instructions recorded in the media may be designed and configured especially for the example embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher-level codes that may be executed by the computer using an interpreter. The described hardware devices may be configured to execute one or more software modules to perform the operations of the above-described example embodiments of the inventive concept, or vice versa.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/ hardware, that manipulates and transforms data represented as physical, electronic quantities within the computer system's registers and memories into other data similarly represented as physical quantities within the computer system memories or registers or other such information storage, transmission or display devices.

At least one example embodiment is generally directed to detection of people in a space. In particular, the present techniques disclose top view people detection and counting for low compute embedded platforms.

Figure 1:
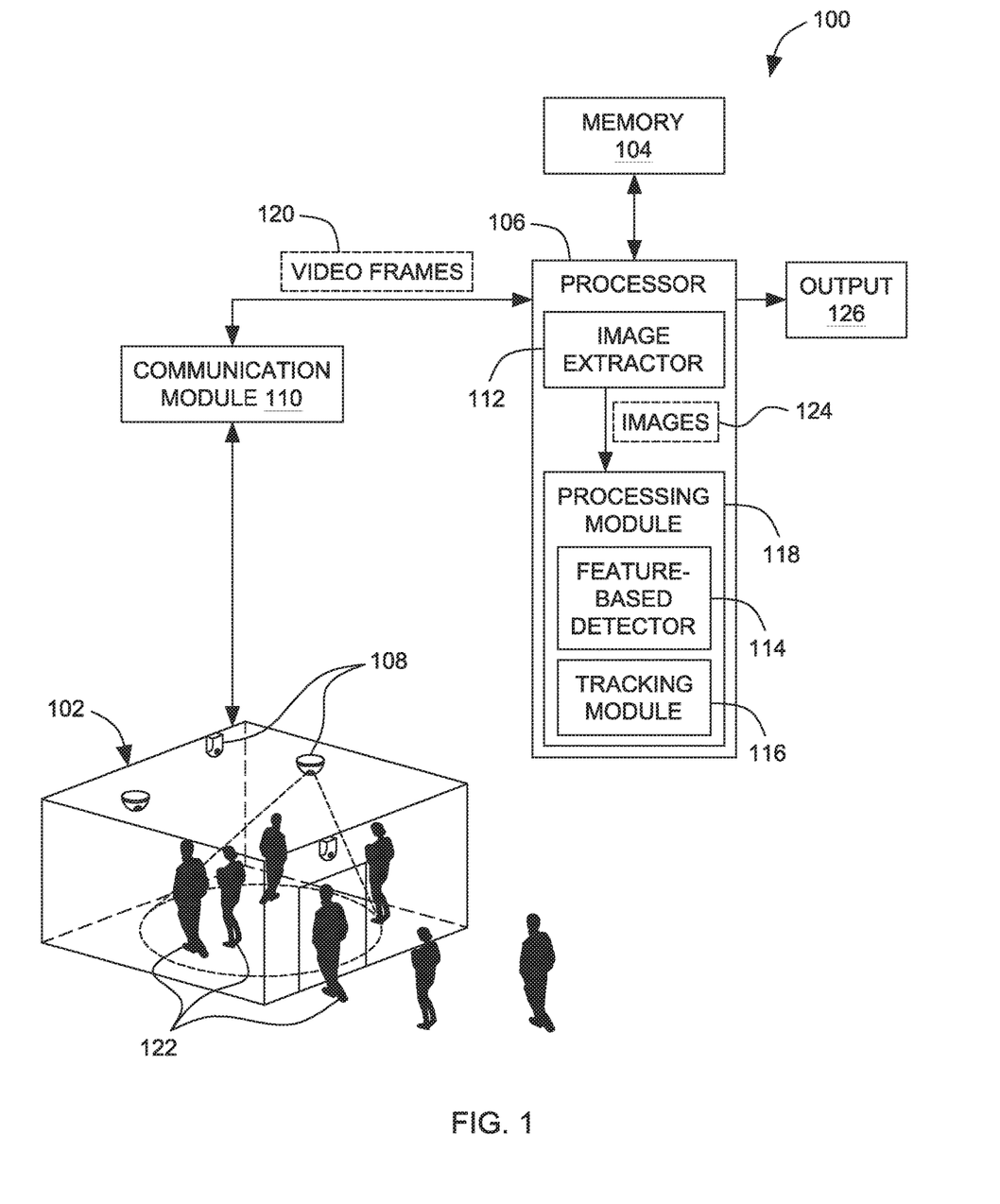
FIG. 1 illustrates an example overhead people detection and tracking system for top view people detection and counting in a space, implemented according to the aspects of the present technique.

FIG. 1 illustrates an example overhead people detection and tracking system 100 for top view people detection and counting in a space 102, implemented according to the aspects of the present technique. The overhead people detection and tracking system 100 includes a memory 104, a processor 106 and a plurality of overhead video cameras 108 installed within the space 102. As will be appreciated by one skilled in the art the overhead people detection and tracking system 100 may be used for people detection and counting in a variety of spaces such as a retail store, a hospital, a commercial establishment, among others. Each of the plurality of overhead video cameras 108 is configured to capture real-time videos at a pre-determined resolution corresponding to pre-determined detection scales.

Moreover, a communication module 110 is coupled to the processor 106. The communication module 110 is configured to access a plurality of video frames such as generally represented by reference numeral 120 captured using the one or more overhead video cameras 108 installed in the space 102 and to transmit the video frames 120 for further processing by the processor 106. In some examples, the video frames 120 may be stored in the memory and the processor 106 is configured to access the video frames 120 from the memory. In the illustrated embodiment, the processor 106 includes an image extractor 112, a feature-based detector 114, a tracking module 116 and a processing module 118. In this embodiment, processing module 118 includes the feature-based detector 114 and the tracking module 116. Other configurations may be envisaged.

In operation, the system 100 is configured to detect and maintain count of one or more persons generally represented by reference numeral 122 as they enter, exit and/or navigate in the space 102. In the illustrated embodiment, the one or more overhead video cameras 108 may be located at various locations within the space 102. For example, an overhead camera 108 may be located adjacent to an entry point of the space 102 and is configured to capture real-time video feed of the one or more persons 122 entering or exiting the space 102. Similarly, the plurality of overhead cameras 108 may be placed at different locations of the space 102. Each component is described in detail below.

In one example, the processor 106 is configured to select a resolution for each of the plurality of overhead video cameras 108. In an embodiment, the resolution is selected to capture the video frames 120 within pre-determined detection scales. In an embodiment, the resolution is selected based upon an installation height of each of the one or more overhead video cameras 108, average size of the person 122, or combinations thereof. In this embodiment, the resolution is computed using average person size such that the person 122 gets detected in first few scales.

In this example, the average person size is a function of installation height and is utilized as an input parameter during device setup. For example, for a camera installation height 'h' where $h \in H = \{h_1, h_2, h_3, \ldots, h_n\}$, there exist a scale 's' where $s \in S = \{s_1, s_2, s_3, \ldots, s_n\}$ in which detection occurs. In this example, there exist an image resolution $r \in R = \{r_1, r_2, r_3, \ldots, r_{12}\}$ corresponding to each scale. In one example, for a person getting detected in scale say 's5', the computation done on scales from $s_1$-$s_4$ may not be required. Therefore, the input video track is recorded at a resolution corresponding to $s_5$ such that $s_5$ is the first scale of detection. The optimization of restricting detection scales and capturing video at optimal resolution facilitates implementation in real-time on low compute devices. It should be noted that as the resolution of image decreases there is an increase in the false positives. The resolution optimization such as described above substantially reduces the occurrence of false positives. As described herein, the term "false positives" refers to objects detected in space that are not people present in the space and are falsely misclassified as people by the feature-based detector 114.

The image extractor 112 is configured to extract one or more images 124 of the space 102 from the plurality of video frames 120. The feature-based detector 114 is configured to process the one or more images 124 to identify person detections in the space 102. In this embodiment, each detection corresponds to a person present in the space 102. In an example embodiment, the feature-based detector 114 may include a detector based on Adaboost classifier, Aggregated Channel Feature (ACF) detector, or combinations thereof. Other alternative detectors may be envisaged.

In the illustrated embodiment, the actual In/Out count of the one or more persons 122 entering or exiting the space may be updated only when each person 122 goes out of the view completely. The feature-based detector 114 and the tracking module 116 are configured to provide an accurate detection and count of persons moving in the space and can handle a variety of situations such as people loitering in the video frames, false counts resulting from people changing their minds halfway while crossing the mid-lines of the frames, and so forth. It should be noted that there may be missed detections and false positives that may be present in the space. Such cases may be handled by the system 100 and to accurately predict and maintain an accurate count of the persons 112 as described below.

The tracking module 116 is configured to analyze the detections to define at least one of true positives and false positives associated with movement of one or more persons 122 within the space 102. Moreover, the tracking module 116 is configured to maintain a count of the one or more persons 122 entering and/or exiting the space 102 based upon at least the one of the true positives and false positives. In an embodiment, the tracking module 116 is configured to analyze the detections to define missed detections. The tracking module 116 is configured to maintain a substantially accurate count of the one or more persons 122 entering and/or exiting the space 102 while accounting for the missed detections, true positives and false positives.

In some embodiments, a plurality of detection regions within the space 102 may be identified and the tracking module 116 is configured to estimate the count of the one or more persons 122 entering and/or exiting the space 102 based on region of first and last true detection in the plurality of detection regions.

In one example, a detection zone may be defined in the space 102. The tracking module 116 is configured to detect one or more persons 122 that have crossed mid-lines of the detection zone and have or have not fully traversed across the detection zone. In another example, the tracking module 116 is configured to identify one or more terminated video tracks based on the missed detections. The tracking module 116 is further configured to identify one or more false video tracks initiated based on the false positives. In another embodiment, the feature-based detector 114 is configured to identify one or more latched video tracks based on the false positives.

As described before, the tracking module 116 is configured identify new detections in the space 102 and to maintain a count of the one or more persons 122 entering and/or exiting the space based upon at least one of the true positives and the false positives. In an example embodiment, the count of one or more persons 122 entering and/or exiting the space is determined using Kalman correction and Hungarian assignment solver. The operation of the tracking module 116 will be described in detail below with reference to FIG. 2.

In this embodiment, the processor 106 is configured to maintain frame by frame history of true detections, the false positives and the missed detections. In operation, new detections are identified in the space 102. Moreover, at least one of an average confidence value, a number of missed video frames and a number of detected video frames is maintained for each of the new detections. The processor 106 is further configured to compare the average confidence value, the number of missed video frames and the number of detected video frames for each of the new detections with a learning rate of the tracking module 116. In this embodiment, the learning rate may be based upon a number of video frames 120 associated with detection of false positives. It should be noted that the learning rate is a parameter measured in "number of frames", wherein each detection missed/detected frame history is compared with this parameter and the classification of true or false positive is made accordingly. The learning and unlearning of the false positives by the detection and tracking module will be described in detail with reference to FIG. 3.

In this embodiment, the processing module 118 described above is implemented with an asynchronous multi-threaded design to further enhance the efficiency and accuracy of the system 100. The processing module 118 encompasses the detector 114 and the tracking module 116. In this embodiment, the processing module 118 is configured to create an input buffer queue of video frames 120. In operation, each of the video frames 120 is assigned to the input buffer queue. The processing module 118 is further configured to generate a tracking thread and a plurality of detection threads. The processing module 118 is configured to operate the plurality of detection threads in parallel to perform the detections for each of the video frames 120. Additionally, the processing module 118 is configured to operate the tracking thread to track and maintain the count of the one or more persons 122 present in the space 102. The count of the one or more persons 122 present in the space 102 may be displayed to a user of the system 100 via an output 126. The video frames 120, the images 124, the tracking threads, the detection threads, the count of the detections and the like, may be stored in the memory 104.

While FIG. 1 illustrates and the following provides a detailed description of various components/modules of the system 100, example embodiments are not limited thereto. For example, the above-identified modules of the system 100 may be implemented via one or more processors (e.g., processor 106) where the one or more processor is configured to execute computer readable instructions stored on a memory (e.g., memory 104) to carry out the functionalities of each of the above-identified modules.

Figure 2:
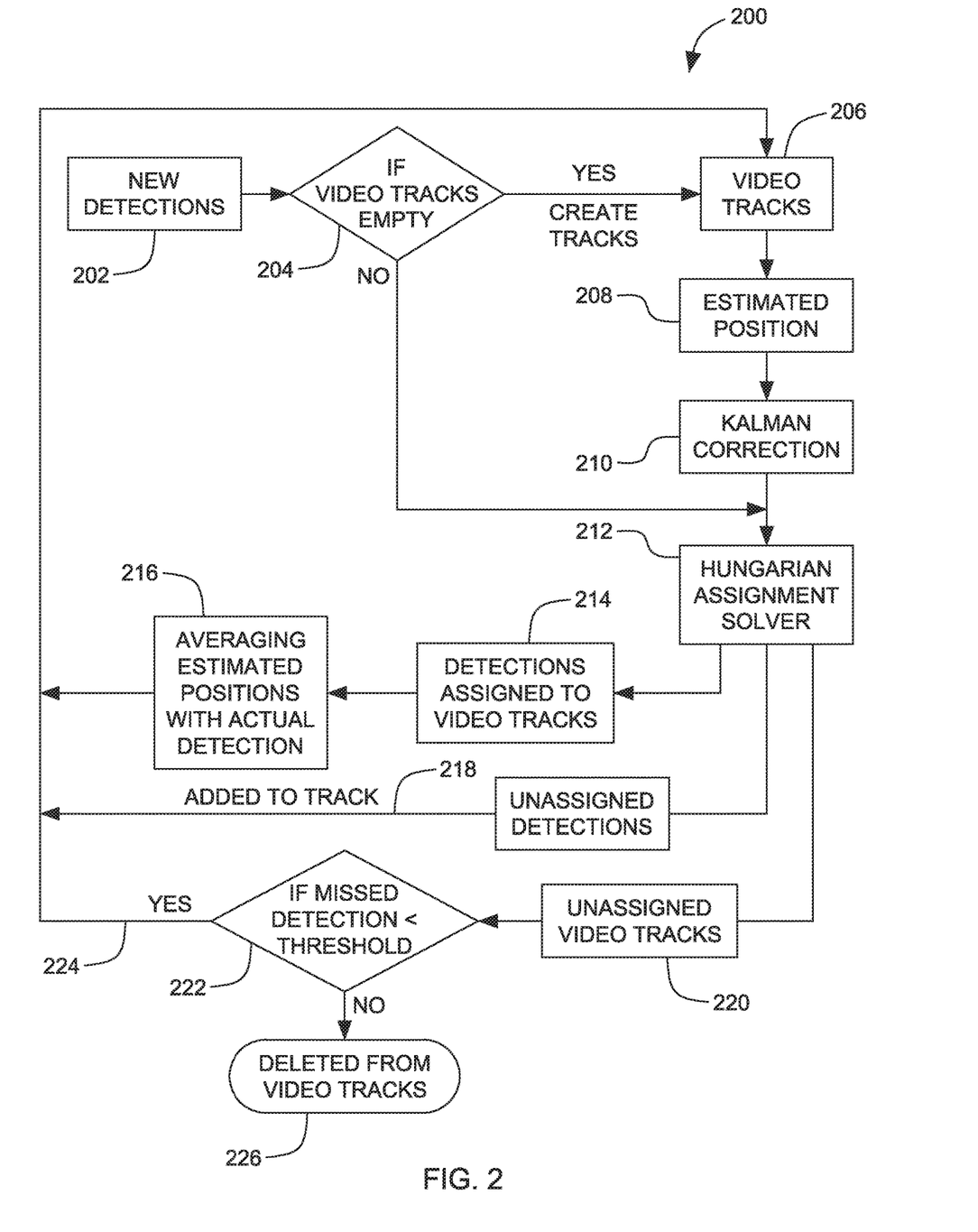
FIG. 2 illustrates an example process for tracking of detections using the overhead people detection and tracking system of FIG. 1, implemented according to the aspects of present technique.

FIG. 2 illustrates an example process 200 for tracking of detections using the overhead people detection and tracking system 100 of FIG. 1, implemented according to the aspects of present technique.

At block 202, new detections in a space (e.g., 102) are identified. At block 204, if it is detected that the video tracks are empty then new video tracks are created (block 206). At block 208, the position of the detection is estimated. In an embodiment, in order to track the detected person, the position of track in subsequent video frames (e.g., 120) needs to be predicted and association of those predicted positions to the corresponding video tracks is required.

At block 210, Kalman correction in combination with position and velocity as the parameters are used to track the detections. In the prediction step of Kalman correction, the estimates of new detection from the current state variables (position and velocity) are produced along with their uncertainties. In this embodiment, such estimates are updated using the next true measurement or the next predicted measurement. In an embodiment, such estimates are passed to Hungarian assignment solver (block 212) where they are assigned to video tracks.

In certain embodiments, missed detections causes premature termination of tracks, while false positives initiate false tracks and also affect the true tracks by latching. In this embodiment, fine tuning of Kalman filter predictive feature based on displacement and velocity resolves the problem of missed detection and keeps the track from premature termination.

At block 214, the detections are assigned to video tracks and the estimated position of the detections are averaged with actual detection (block 216).

At block 218, the unassigned detections are added to the video tracks. For unassigned tracks (block 220), the missed detections are compared with a pre-determined threshold. If it is determined that the missed detection frame count is less than the threshold (block 222), then the video tracks are retained in track database of the video tracks 206, as represented by reference numeral 224, otherwise such video tracks are deleted (block 226). In an example, the tracking starts from the first detection and gets terminated when a track is not assigned to any of the new detection for a fixed number of subsequent continuous video frames (fixed threshold value of missed video frames). If the track is assigned even for a single video frame before reaching that threshold value then it's counter is reset and maintains the track to be alive.

Figure 3:
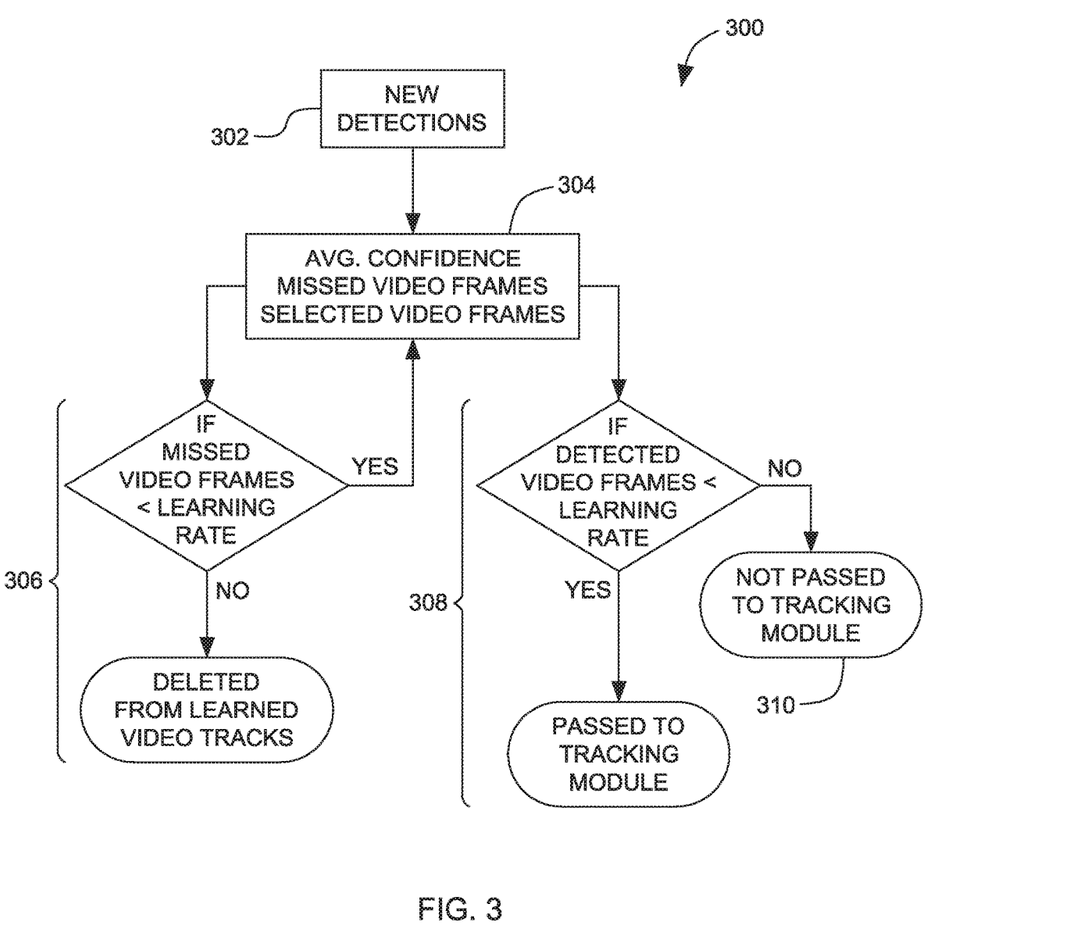
FIG. 3 illustrates an example process for training the tracking module for dynamic learning and unlearning of false positives using the system of FIG. 1, implemented according to the aspects of present technique.

FIG. 3 illustrates an example process 300 for training the tracking module 116 for dynamic learning and unlearning of false positives using the system 100 of FIG. 1, implemented according to the aspects of present technique. In this embodiment, certain assumptions may be made for dynamic learning/unlearning of the false positives. For example, the location of occurrence of false positive may be set as constant for a given field of view (FOV). Further, it may be assumed that the FOV does not change as they are always present in the video frame.

At block 302, new detections are identified. At block 304, an average confidence value, number of missed video frames and a number of detected video frames for each of the new detections in tracker is maintained. In a further embodiment, the average confidence value, the number of missed video frames and the number of detected video frames are compared with a learning rate for each of the new detections. In this embodiment, the learning rate may be based upon a number of video frames 120 associated with detection of false positives.

At block 306, a video track is deleted from learned video tracks if the number of missed video frames is greater than the learning rate. In other words, a video track is deleted when missed video frames count crosses the threshold of learning rate.

At block 308, if the number of detected video frames is less than the learning rate (block 308), then the video track is passed to the tracking module (e.g., 116), otherwise the video tracks are not passed to the tracking module 116 (block 310). In an embodiment, such history is maintained for nearby area of detection instead of single point to negate the effects of jitter.

It should be noted that the system 100 is configured to differentiate between a learned true positive and false positive. For each detection, a true positive, even though learned, will not be present for the entire duration, therefore, the unlearning of detection. If the number of missed detection frames is greater than the threshold of learning rate, then that detection is unlearned.

Figure 4:
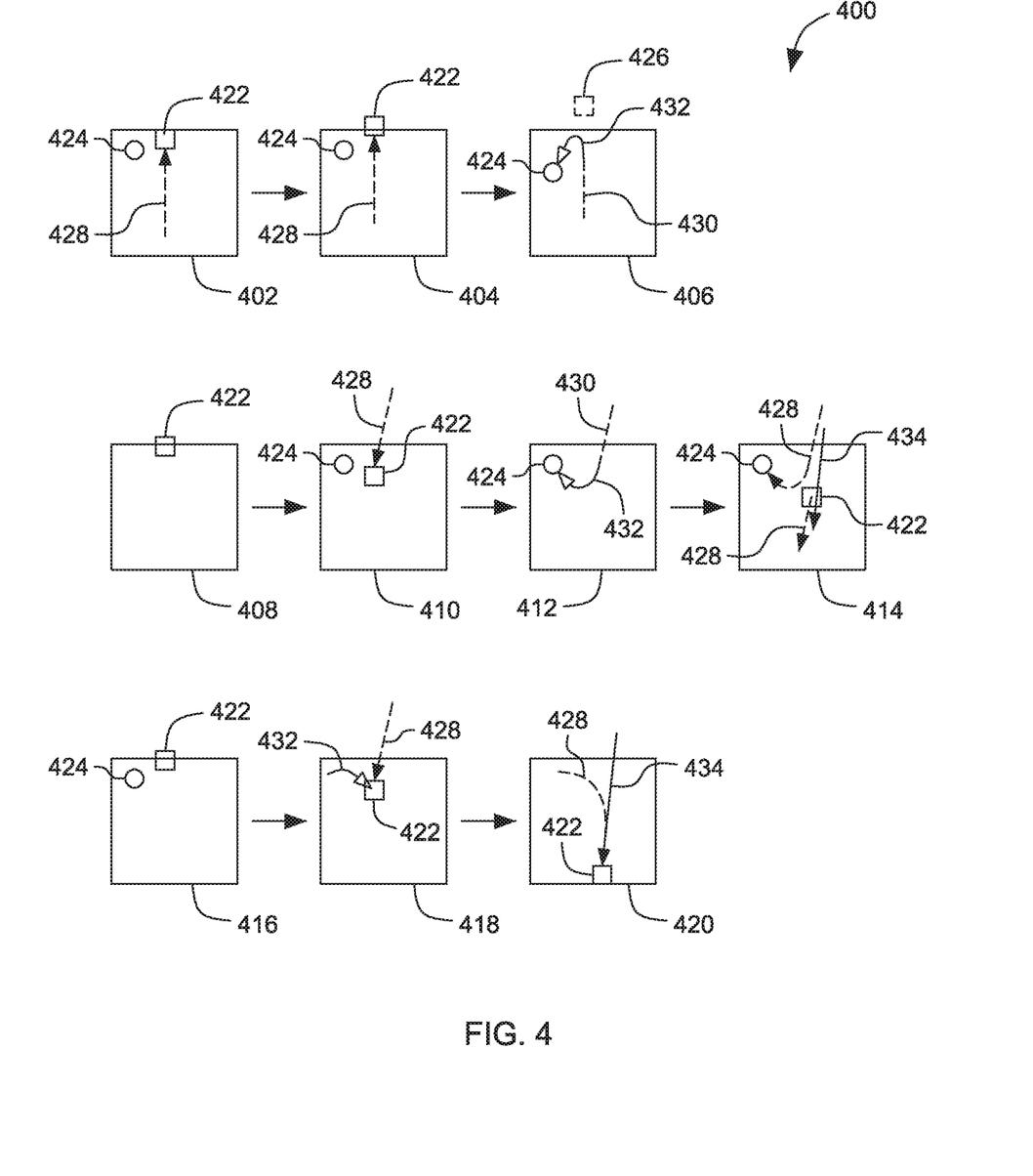
FIG. 4 illustrates various track latching scenarios handled by the system of FIG. 1, implemented according to the aspects of the present technique.

As described before the system 100 of FIG. 1 is configured to handle events such as missed detections and latching and to provide an accurate estimate of the count of peoples. It should be noted that missed detection causes premature termination of tracks, while false positives initiate false tracks and also affect the true tracks by latching FIG. 4 illustrates various track latching scenarios handled by the system 100 of FIG. 1. In the illustrated embodiment, video frames 402, 404 and 406 illustrate a tracking jitter and deceleration at the edge of the frame along with false positives. In this example, a detection represented by the reference numeral 422 is moving out of the video frame 402. The video track of the detection 422 is represented by reference numeral 428. The latching of video track as illustrated is represented by reference numeral 432. In this example, when a person/detection 422 goes out of the video frame 406, as represented by reference numeral 426, the video track 428 should end with no detection assignment, but instead, the video track is assigned to a false positive 424 and the count is missed.

Similarly, in another embodiment, the video frames 408, 410, 412 and 414 illustrate appearance of false positives and missed detection. In this example, when missed detection happens, the track of true positive 428 may be assigned to false positive 424 and when person is detected again, a new track 434 is initiated and the old track 428 is lost to the false positive. This results in original track 428 latching on to the false positive 424 and a new video track is initiated for actual detection 422 leading to inaccurate tracking and count miss.

In another example, as illustrated in video frames 416, 418 and 420, latching of a false positive video track to true positive creates false initiation point of video track, leading to count miss. Such false positive gain some velocity due to jitter in detection and causes the problem of latching. The system 100 of FIG. 1 is configured to handle the latching issues such as described above by dynamic learning and un-learning of the false positives. As described above, the system maintains the average confidence, number of missed frames and number of detected frames for every detection in the tracking module 116. If any detection crosses the threshold of number of detected frames then that detection is not passed to Kalman and Hungarian. This history is maintained for nearby area of detection instead of a single point to negate the effects of jitter.

Figure 5:
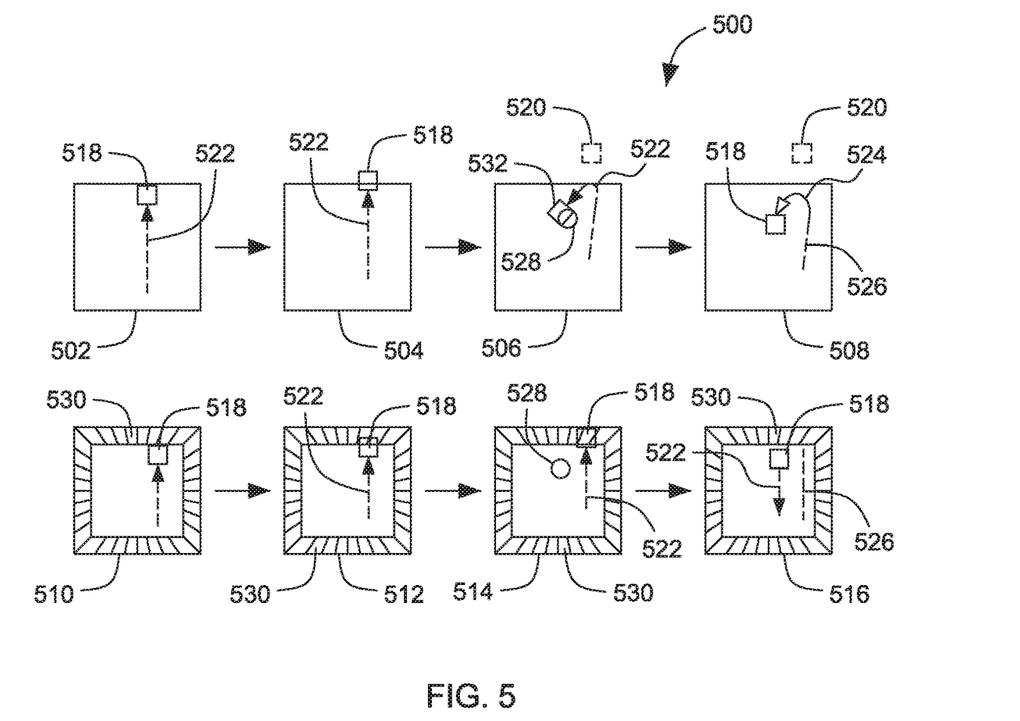
FIG. 5 illustrates a region-based tracking process to handle track latching events, implemented according to the aspects of the present technique.

FIG. 5 illustrates a region-based tracking process 500 to handle track latching events, implemented according to the aspects of the present technique. As illustrated in video frames 502, 504, 506 and 508, partial visibility of detection 518 at the edge of video frames causes jitter. Here, the predicted position of the detection is represented by reference numeral 532 and the new detection is represented by reference numeral 528. The detection 518 is moving out of the video frame 504 with an outward velocity and acceleration, but detected center remains constant due to gradually reducing detected partial rectangle size. The stationary center and the jitter give apparent deceleration as illustrated in video frame 506 in contrast to actual direction of movement. This leads to Kalman filter prediction in opposite direction. This estimation may cause the video track to latch on a nearby detection such as illustrated in the video frame 508.

In the illustrated embodiment, video frames (510, 512, 514 and 516) illustrate the effect of buffer zone based upon region-based tracking. In this example, the detection 518 is moving out of the video frame as shown in video frame 512. In an embodiment, the regions at the corner/edge of the video frames (510, 512, 514 and 516) is represented by reference numeral 530. Such regions or buffer zones 530 provide the buffer and act as virtual frame boundaries to terminate a video track 522 with no false prediction as illustrated in video frame 514. Further, a new video track is initiated for a new detection as illustrated in video frame 516.

Figure 6:
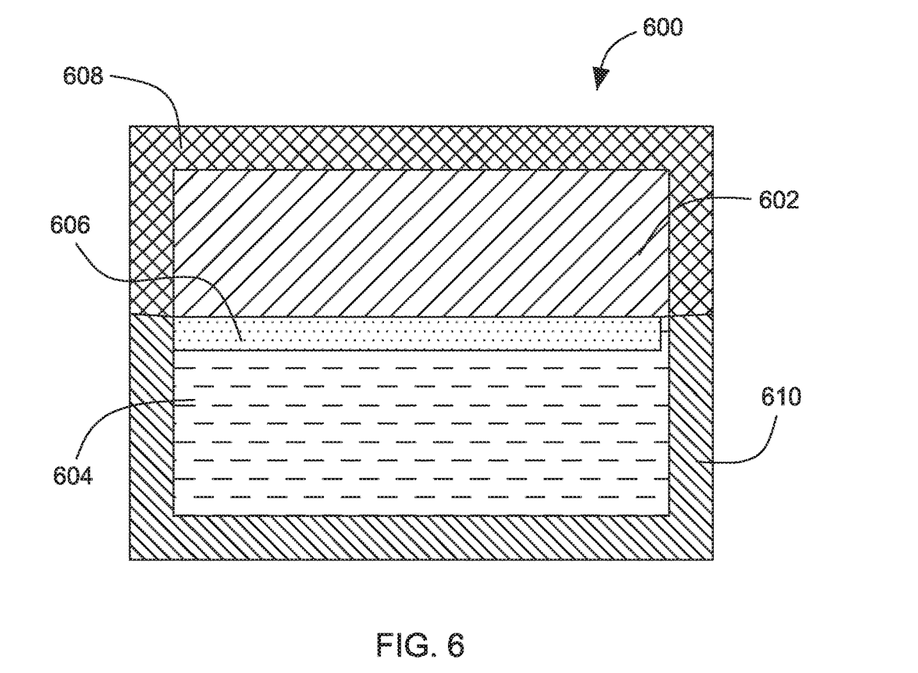
FIG. 6 illustrates an example zone map used for maintaining a count of one or more persons entering and/or exiting the space, implemented according to the aspects of the present technique.

The system 100 of FIG. 1 utilizes different zones in the field of view for counting of people. FIG. 6 illustrates an example zone map 600 used for maintaining a count of one or more persons entering and/or exiting the space, implemented according to the aspects of the present technique. In an embodiment, the field of view (FOV) is divided in different regions such as red as represented by reference numeral 602, green as represented by reference numeral 604, yellow as represented by reference numeral 606, pink as represented by reference numeral 608 and cyan as represented by reference numeral 610. In this embodiment, the counting is done based on region of first detection and last true detection. The starting region and ending region for every video track is maintained and once the video track is terminated, the corresponding count is updated. For example, an incoming count (IN count) is increased for the video track starting from either red region 602 or pink region 608 and ending either at green region 604 or cyan region 610. Similarly, an outgoing count (OUT count) is increased for the video track starting from either green region 604 or cyan region 610 and ending either red region 602 or pink region 608. In the illustrated embodiment, the yellow region 606 is defined as a buffer zone where no change of count takes place whether detection begins or ends. In addition, the pink region 608 represents a virtual boundary towards exterior, while cyan 610 represents an interior virtual boundary.

It will be understood by one skilled in the art, that the accuracy of the tracking algorithm such as described above is dependent on the frame rate of the system 100. In certain embodiments, the tracking accuracy is reduced as the frame rate decreases. In addition, the frame rate measured in frame rate per sec (fps) achieved with a single threaded implementation may be substantially low. Moreover, the time taken to process a frame is dependent on the number of people in the frame. This may lead to a below average fps in case of multiple people in the video frame. Thus, a single threaded implementation may not achieve the required accuracy. The system 100 is configured to implement a multiple threaded design. The manner in which the algorithm is implemented using system 100 is described below in FIG. 7.

Figure 7:
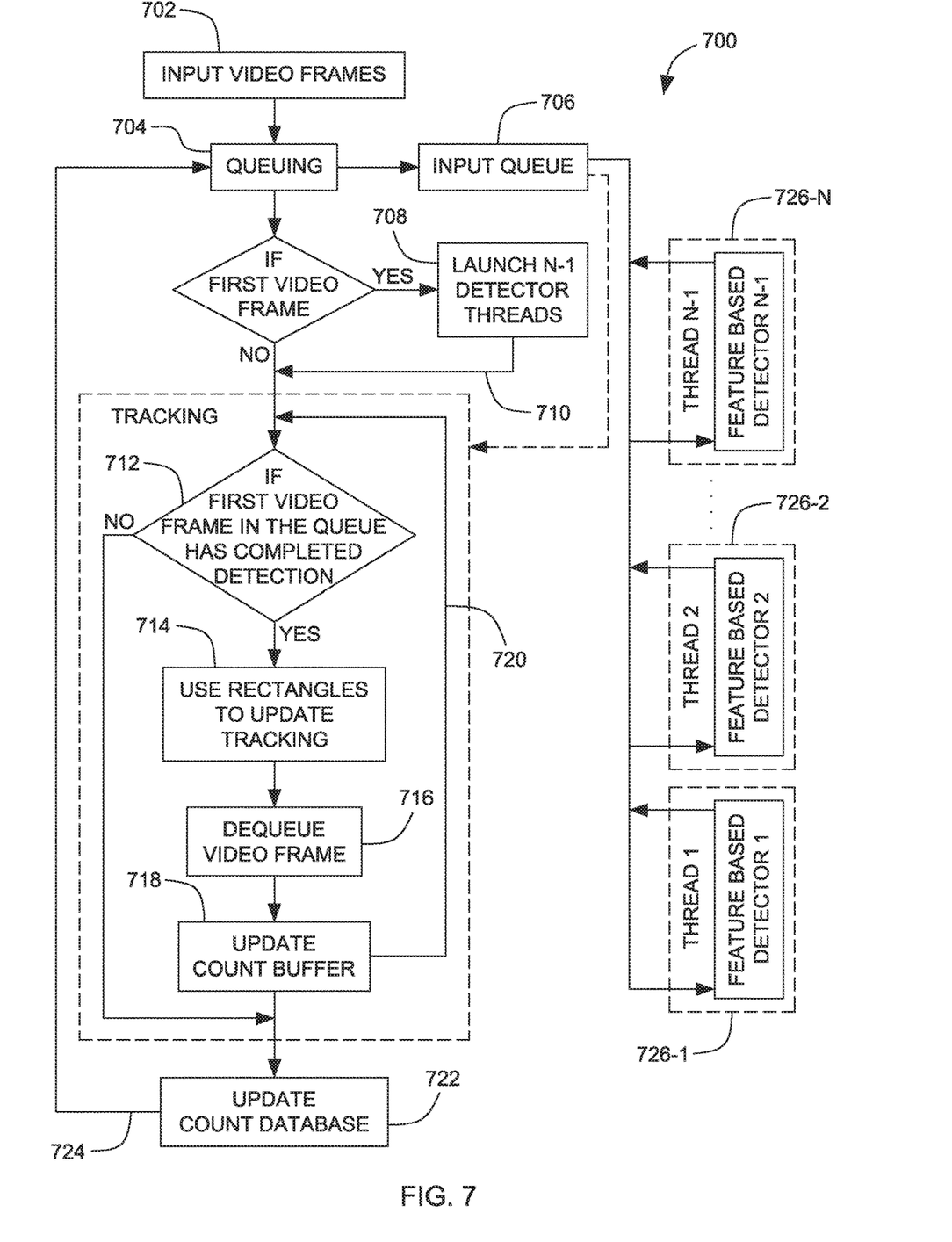
FIG. 7 illustrates example process module implemented with an asynchronous multithreaded design of the system, implemented according to the aspects of the present technique.

FIG. 7 illustrates example processing module (such as 118) 700 implemented with an asynchronous multithreaded design of the system 100. The processing module (e.g., 118)

is configured to create an input buffer queue of the video frames (e.g., 120). In an example, the input video frames (block 702) are queued to an input buffer queue (block 704, 706) to ensure a constant frame rate irrespective of presence of detections in the video frame. Such input buffer queue may be transmitted to the multi-threaded detector (e.g., feature-based detector 1 through feature-based detector N−1). In an embodiment, multiple instances of detector (e.g., feature-based detector 1 through feature-based detector N−1) may work independently. The multi-threaded implementation is generally represented by reference numerals 726-1 through 726-N that are representative of feature based detector 114 of FIG. 1. It may be noted that the detection of video frames is independent of any previous or future video frames. In this example, an implementation is configured for N threads, where N is an input parameter. In addition, the main thread performs queuing of video frames into the buffer and tracking job.

For the first video frame, (N−1) detector threads are launched. In one embodiment, the master thread launches N−1 threads (block 708). Each of the (N−1) threads perform detection on a particular video frame. Once launched, such threads may run continuously until the exit is called (710). In this example, each of the multi-threaded detector (726-1 through 726-N) identifies frames in the input queue in timestamp order. In an embodiment, each multi-threaded detector (726-1 through 726-N) identifies the first video frame on which detection is not performed, performs a detection and puts back into the queue along with detected rectangles to maintain the temporal order. In this example, the multi-threaded detectors (726-1 through 726-N) may run asynchronously as the detection on a single video frame is independent of other video frames.

In this embodiment, the tracking of the count of one or more detections may be sequential. In this example, there is only one instance of tracking performed by the main thread. Further, after queuing an input video frame, the main thread checks whether the first frame in the queue has completed detection (block 712). If yes, it uses those rectangles (block 714) to update tracking and dequeue the video frame (block 716) and checks for the next oldest video frame. The blocks 714 represent the tracking module 116 such as described with reference to FIG. 1. This is followed by updating the count buffer (block 718) and this process is repeated until a frame on which detection is not completed is in the front of the queue (720). Further, the count database is updated (block 722) and the process is repeated (724).

Figure 8:
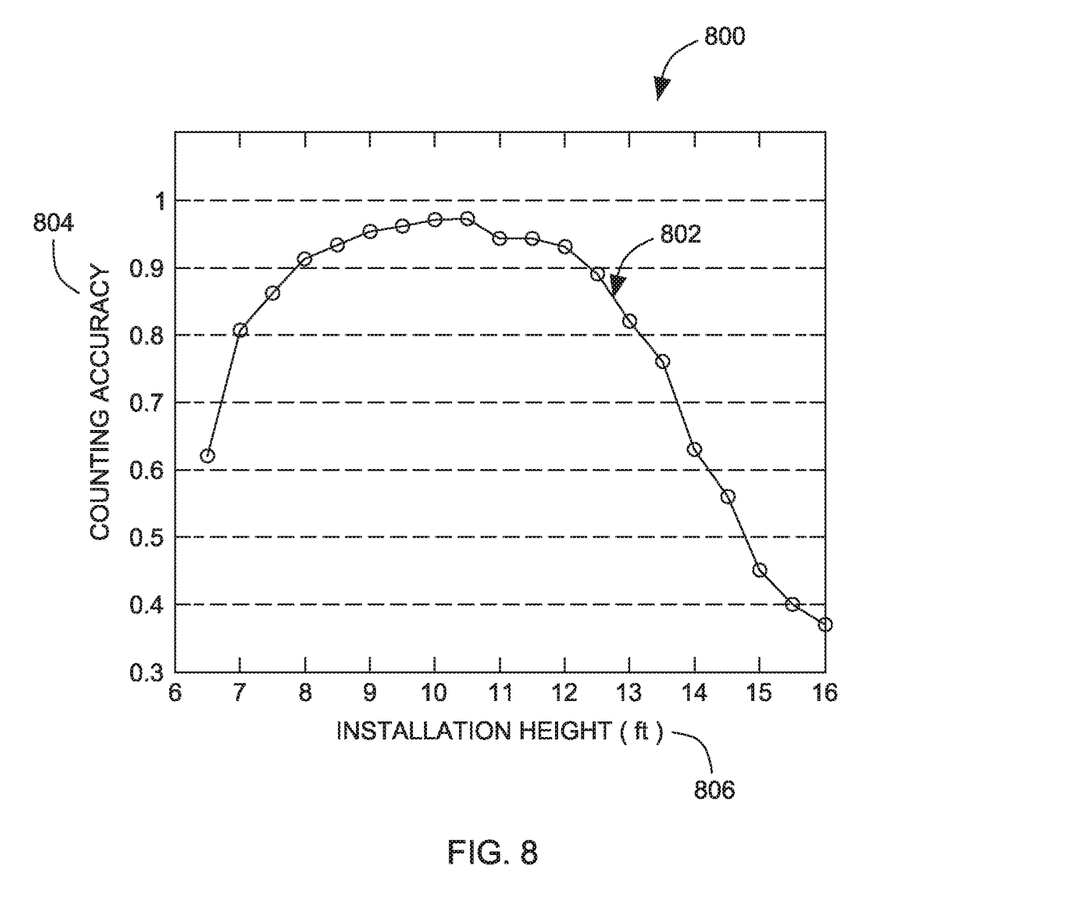
FIG. 8 illustrates an example graph depicting counting accuracy for different installation heights, implemented according to the aspects of the present technique.

FIG. 8 illustrates an example graph 800 depicting counting accuracy for different installation heights. The illustrated graph 800 assesses real time performance of a real time detection and tracking system such as system 100 installed at 100+ public locations with different ambient settings and at different installation heights. In this example, the curve 802 represents the real time performance of the system in terms of counting accuracy 804 with respect to installation height (measured in ft) 806. As can be seen, the counting accuracy 804 increases initially with an increase in the installation height and decreases later. Accordingly, a resolution of the overhead cameras may be selected based upon the installation height.

Thus, the system 100 provides a novel approach of using overhead person detector along with multiple optimization to improve accuracy of the result, performance and compute time. Moreover, the system 100 incorporates novel and efficient techniques to handle false positives by dynamic learning/unlearning. This in turn, achieved an accuracy of 97% in real time for a low computing embedded device.

The modules of the overhead people detection and tracking system 100 described herein are implemented in computing devices. One example of a computing device 1200 is described below in FIG. 9. The computing device includes one or more processor 902, one or more computer-readable RAMs 904 and one or more computer-readable ROMs 906 on one or more buses 908. Further, computing device 900 includes a tangible storage device 910 that may be used to execute operating systems 920 and an overhead people detection and tracking system 100. The various modules of the system 100 includes a memory 104, a processor 106 and a plurality of overhead video cameras 108 installed within the space 102. The processor 106 includes an image extractor 112, a feature-based detector 114, a tracking module 116 and a processing module 118.

Figure 9:
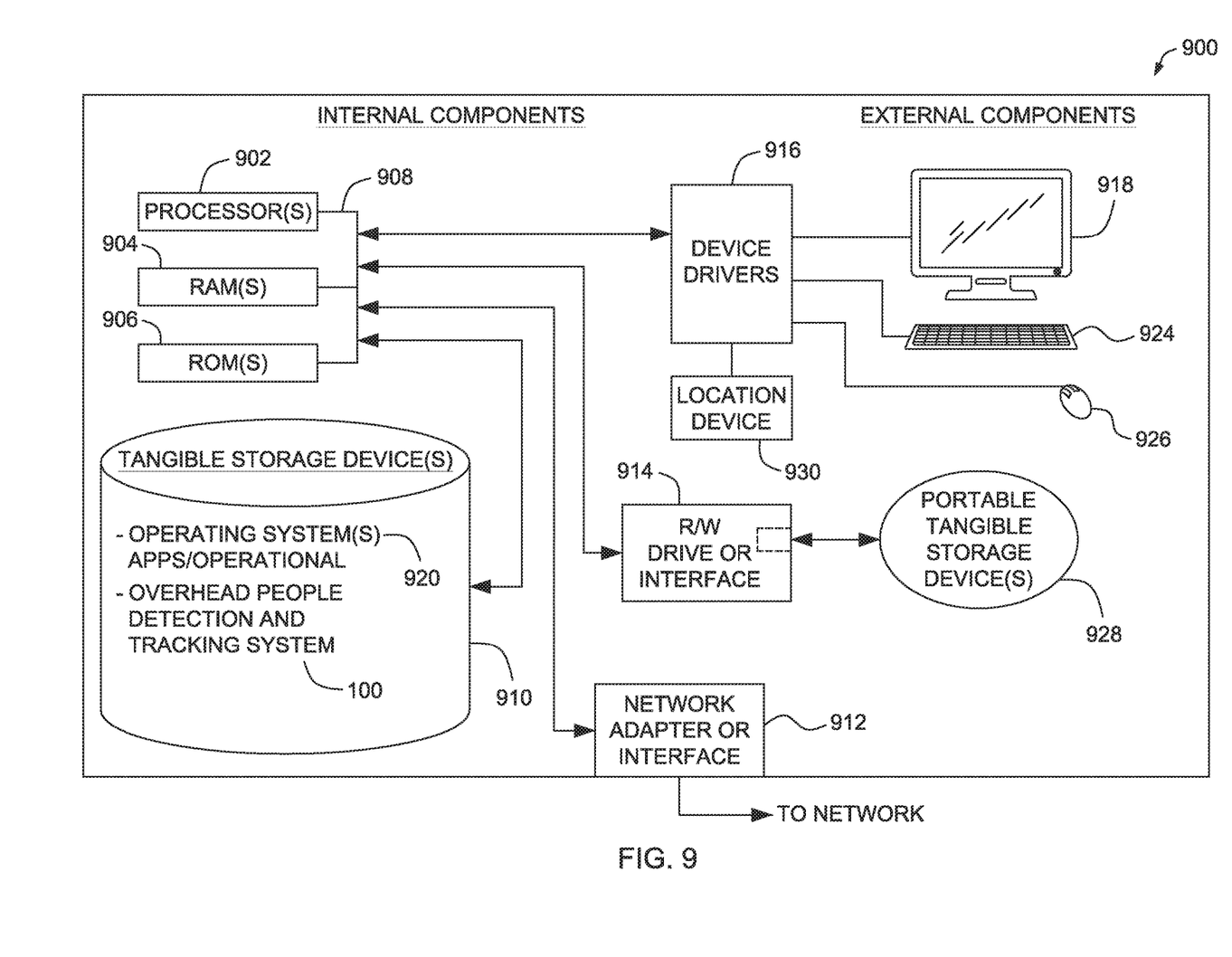
FIG. 9 is a block diagram of an embodiment of a computing device in which the modules of the overhead people detection and tracking system, described herein, are implemented.

The modules may be stored in tangible storage device 910. Both, the operating system 920 and the system 100 are executed by processor 902 via one or more respective RAMs 904 (which typically include cache memory). The execution of the operating system 920 and/or the system 100 by the processor 902, configures the processor 902 as a special purpose processor configured to carry out the functionalities of the operation system 920 and/or the overhead people detection and tracking system 100, as described above.

Examples of storage devices 928 include semiconductor storage devices such as ROM 906, EPROM, flash memory or any other computer-readable tangible storage device that may store a computer program and digital information.

Computing device also includes a R/W drive or interface 914 to read from and write to one or more portable computer-readable tangible storage devices 928 such as a CD-ROM, DVD, memory stick or semiconductor storage device. Further, network adapters or interfaces 912 such as a TCP/IP adapter cards, wireless Wi-Fi interface cards, or 3G or 4G wireless interface cards or other wired or wireless communication links are also included in computing device.

In one example embodiment, the overhead people detection and tracking system 100 includes a memory 104, a processor 106 and a plurality of overhead video cameras 108 installed within the space 102. The processor 106 includes an image extractor 112, a feature-based detector 114, a tracking module 116 and a processing module 118 and may be stored in tangible storage device 928 and may be downloaded from an external computer via a network (for example, the Internet, a local area network or other, wide area network) and network adapter or interface 912.

Computing device further includes device drivers 916 to interface with input and output devices. The input and output devices may include a computer display monitor 918, a keyboard 924, a keypad, a touch screen, a computer mouse 926, and/or some other suitable input device. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

While only certain features of several embodiments have been illustrated, and described herein, many modifications and changes will occur to those skilled in the art. It is, therefore, to be understood that the appended claims are intended to cover all such modifications and changes as fall within the true spirit of inventive concepts.

The afore mentioned description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the example embodiments is described above as having certain features, any one or more of those features described with respect to any example embodiment of the disclosure may be implemented in and/or combined with features of any of the other embodiments, even if that combination is not explicitly described. In other words, the described example embodiments are not mutually exclusive, and permutations of one or more example embodiments with one another remain within the scope of this disclosure.

The invention claimed is:

1. An overhead people detection and tracking system, the system comprising:
   a memory having computer-readable instructions stored therein;
   at least one processor configured to execute the computer-readable instructions to,
   access a plurality of video frames captured using one or more overhead video cameras installed in a space;
   extract one or more images of the space from the plurality of video frames;
   process the one or more images to identify person detections in the space, wherein each detection corresponds to a person present in the space;
   analyze the detections to define at least one of true positives and false positives associated with movement of one or more identified persons within the space;
   maintain a count of the one or more identified persons entering and/or exiting the space based upon at least one of the true positives and the false positives;
   identify one or more terminated video tracks based on the detections;
   identify one or more false video tracks initiated based on the false positives;
   identify one or more latched video tracks based on the false positives; and
   track the count of the one or more identified persons entering and/or exiting the space using the identified terminated video tracks, false video tracks and latched video tracks.

2. The overhead people detection and tracking system of claim 1, wherein the at least one processor is further configured to:
   analyze the detections to define missed detections; and
   determine an accurate count of the one or more identified persons entering and/or exiting the space irrespective of the missed detections.

3. The overhead people detection and tracking system of claim 1, wherein the at least one processor is further configured to execute the computer-readable instructions to:
   identify a plurality of detection regions within the space; and
   estimate the count of the one or more persons entering and/or exiting the space based on regions of first and last true detections in the plurality of detection regions.

4. The overhead people detection and tracking system of claim 1, wherein the at least one processor is further configured to execute the computer-readable instructions to:
   assign each of the video frames to an input buffer queue;
   generate a tracking thread and a plurality of detection threads;
   operate the plurality of detection threads in parallel to perform detections for each of the video frames; and
   operate the tracking thread to estimate and maintain the count of the one or more persons present in the space.

5. The overhead people detection and tracking system of claim 1, further comprising:
   a plurality of overhead video cameras installed within the space, wherein each of the plurality of overhead video cameras comprises a feature-based detector.

6. The overhead people detection and tracking system of claim 1, wherein the at least one processor is further configured to execute the computer-readable instructions to:
   select a resolution for each of a plurality of overhead video cameras, wherein the resolution is selected to capture the video frames within desired detection scales; and
   capture the video frames using the plurality of overhead video cameras at the selected resolution.

7. The overhead people detection and tracking system of claim 6, wherein the at least one processor is further configured to execute the computer-readable instructions to select the resolution based upon an installation height of each of the plurality of overhead video cameras, average size of a person, or combinations thereof.

8. The overhead people detection and tracking system of claim 1, wherein the at least one processor is further configured to execute the computer-readable instructions to:
   define a detection zone within the space; and
   detect one or more persons that have crossed mid-lines of the detection zone and either have or have not fully traversed across the detection zone.

9. The overhead people detection and tracking system of claim 1, wherein the at least one processor is further configured to:
   provide one or more buffer zones at edges/corners of the video tracks;
   facilitate region-based tracking using the one or more buffer zones; and
   prevent latching of video tracks using the buffer zones, wherein the buffer zones act as virtual boundaries to avoid false predictions.

10. The overhead people detection and tracking system of claim 1, wherein the at least one processor is further configured to execute the computer-readable instructions to maintain a frame by frame history of true detections, the false positives and missed detections.

11. The overhead people detection and tracking system of claim 10, wherein the at least one processor is further configured to execute the computer-readable instructions to:
identify new detections in the space;
maintain at least one of an average confidence value, a number of missed video frames and a number of detected video frames for each of the new detections; and
compare the average confidence value, the number of missed video frames and the number of detected video frames for each of the new detections with a learning rate for each of the new detections.

12. The overhead people detection and tracking system of claim 11, wherein the learning rate is based upon a number of video frames associated with detection of false positives.

13. The overhead people detection and tracking system of claim 11, wherein the at least one processor is further configured to execute the computer-readable instructions to:
delete a video track frame history from learned video tracks frame histories in response to the number of missed frames being greater than the learning rate; and
transmit the video track to a tracking module in response to the number of detected video frames being less than the learning rate.

14. The overhead people detection and tracking system of claim 10, wherein the at least one processor is further configured to execute the computer-readable instructions to:
maintain the count of the one or more persons entering and/or exiting the space using Kalman correction and Hungarian Assignment solver.

15. The overhead people detection and tracking system of claim 1, wherein the at least one processor is further configured to execute the computer-readable instructions to:
divide a field of view in a plurality of regions, wherein each of the plurality of regions is indicated by a corresponding color;
maintain a starting region and an ending region for each video track; and
maintain a count of one or more persons entering and/or exiting the space based on region of first and last true detection.

16. An overhead people detection and tracking system, the system comprising:
a plurality of overhead video cameras installed within a space, each of the plurality of overhead video cameras configured to capture real-time video at a desired resolution corresponding to desired detection scales;
a feature-based detector communicatively coupled to the plurality of overhead video cameras and configured to access video frames of the captured video, wherein the feature-based detector is configured to,
process the video frames and identify person detections in the space, and
analyze the people detections and define the detections as at least one of true positives and false positives; and
at least one processor configured to execute computer-readable instructions to,
estimate and maintain the count of the one or more persons entering and/or exiting the space based upon at least one of the true positives and the false positives,
create an input buffer queue of video frames,
process a plurality of detection threads to perform detection of persons,
process a tracking thread to perform tracking of the persons for each of the video frames of the input buffer queue,
identify one or more terminated video tracks based on the detections,
identify one or more false video tracks initiated based on the false positives,
identify one or more latched video tracks based on the false positives, and
track the count of the one or more persons entering and/or exiting the space using the identified terminated video tracks, false video tracks and latched video tracks.

17. The overhead people detection and tracking system of claim 16, wherein the at least one processor is further configured to execute the computer-readable instructions to:
identify new detections in the space;
maintain at least one of an average confidence value, a number of missed video frames and a number of detected video frames for each of the new detections; and
compare the average confidence value, the number of missed video frames and the number of detected video frames for each of the new detections with a learning rate of the feature-based detector.

18. The overhead people detection and tracking system of claim 16, wherein the feature-based detector comprises, an Aggregated Channel Feature (ACF) detector with an Adaboost classifier.

19. A computer-implemented method for detecting and tracking persons in a space, the method comprising:
accessing a plurality of video frames captured using one or more overhead video cameras installed in a space;
extracting one or more images of the space from the plurality of video frames;
processing the one or more images to identify person detections in the space, wherein each detection corresponds to a person present in the space;
analyzing the detections to define at least one of true positives and false positives associated with movement of one or more identified persons within the space;
maintaining a count of the one or more identified persons entering and/or exiting the space based upon at least one of the true positives and the false positives;
identifying one or more terminated video tracks based on the detections;
identifying one or more false video tracks initiated based on the false positives;
identifying one or more latched video tracks based on the false positives; and
tracking the count of the one or more identified persons entering and/or exiting the space using the identified terminated video tracks, false video tracks and latched video tracks.

20. The computer implemented method of claim 19, further comprising:
generating an input buffer queue of the video frames;
initializing a tracking thread and a plurality of detection threads;
operating in parallel the plurality of detection threads to perform detections for each of the video frames; and operate the tracking thread to estimate and maintain the count of the one or more persons identified present in the space.

\* \* \* \* \*